United States Patent [19]
Fan et al.

[11] Patent Number: 5,473,626
[45] Date of Patent: Dec. 5, 1995

[54] TWO-AXIAL-MODE SOLID-STATE LASER

[75] Inventors: Tso Y. Fan, Cambridge; Peter A. Schulz, North Andover, both of Mass.

[73] Assignee: Massachusetts Institute of Technology, Cambridge, Mass.

[21] Appl. No.: 171,927

[22] Filed: Dec. 21, 1993

[51] Int. Cl.[6] .................................................. H01S 3/106
[52] U.S. Cl. ............................ 372/105; 372/92; 372/21; 372/22; 372/23; 372/33
[58] Field of Search ................................. 372/19, 21, 22, 372/27, 105, 92, 106, 23, 33

[56] References Cited

U.S. PATENT DOCUMENTS

| | | | |
|---|---|---|---|
| 4,860,304 | 8/1989 | Mooradian | 372/92 |
| 4,953,166 | 8/1990 | Mooradian | 372/21 |
| 5,091,912 | 2/1992 | Bretenaker et al. | 372/23 |
| 5,197,073 | 3/1993 | Oka | 372/22 |

OTHER PUBLICATIONS

V. Evtuhov and A. E. Siegman, "A 'Twisted-Mode' Technique for Obtaining Axially Uniform Energy Density in a Laser Cavity," *Applied Optics*, 4(1):142–143 (1965, Jan.).

Anthon, D. W., et al., "Intracavity Doubling of CW Diode-Pumped Nd:YAG Lasers with KTP," *IEEE Journal of Quantum Electronics*, 28(4):1148–1157 (1992) Apr.

*Primary Examiner*—Rodney B. Bovernick
*Assistant Examiner*—Robert McNutt
*Attorney, Agent, or Firm*—Hamilton, Brook, Smith & Reynolds

[57] ABSTRACT

A system for producing laser output from a solid-state laser is described. The laser output comprises two orthogonally polarized axial modes of light at different frequencies having linear polarization. In one embodiment, the two modes are at different frequencies and can be merged together to produce energy waves of variable frequency. This device has applications in microwave generation and velocity measurements.

29 Claims, 5 Drawing Sheets

TWO-AXIAL-MODE SOLID-STATE LASER

GOVERNMENT SUPPORT

The Government has rights in this invention pursuant to Contract Number F 19628-90-C-0002 awarded by the United States Air Force.

BACKGROUND OF THE INVENTION

Solid-state optically pumped lasers comprise, in general, a solid-state lasing material commonly called the gain medium, disposed between two mirrors which form an optical cavity. An optical pump source such as a laser diode or an array of diodes, generates a pump beam or light wave which is focused onto the gain medium. Energy from the pump laser beam in the form of photons is absorbed by the gain medium, energizing gain medium atoms into an excited energy state. A laser system exhibits a population inversion when atoms in an excited energy state are higher in population than atoms in a ground state. When a photon encounters an energized atom in the gain medium, stimulated emission occurs. The photons enter an entrance mirror at one end of the cavity and travel along the axis of the cavity until they are reflected by an exit mirror and returned to the gain medium. Stimulated emission within the gain medium again amplifies the light beam or wave and eventually an optical standing wave resonates within the optical cavity. With proper design, the wave oscillates in a single axial mode within the laser cavity. With single mode oscillation, there are nulls in the standing wave intensity pattern. At these nulls, the inverted population in the gain medium is not saturated.

Methods have been described for attaining two linearly polarized orthogonal axial modes of propagation from a solid-state laser resulting in an axially uniform intensity pattern:
1. V. Evtuhov & A. E. Siegman, A "Twisted Mode" Technique for Obtaining Uniform Energy Density in a Laser Cavity, Applied Optics, Vol. 4, No. 1, January 1965, at 142.
2. D. W. Anthon et al., Intracavity Doubling of CW Diode-Pumped Nd:YAG Lasers with KTP, IEEE Journal of Quantum Electronics, Vol. 28, No. 4, April 1992, at 1148.

In the Evtuhov & Siegman reference, a pair of birefringent elements, such as quarter-wave plates, are provided, one on each side of the gain medium inside the laser cavity. The quarter-wave plates are oriented such that the fast axis of one plate is oriented 90° to the fast axis of the other. The gain medium is either optically isotropic or oriented so that the axis of the laser cavity is parallel to the optical axis of the medium. The eigenpolarizations, or allowed polarizations, of the cavity are linear and oriented along the wave plate axes. The optical path lengths are identical for the two polarizations since the quarter-wave plates are oriented at 90°.

A standing-wave pattern is produced which is axially uniform in intensity, eliminating the nulls in the inverted population. One mode of propagation is orthogonally polarized with respect to the other mode. The sum of the intensities of the two modes is constant along the axis of the cavity. Thus, with two orthogonally polarized modes oscillating in the cavity, the inverted population is uniformly saturated, which precludes other modes from oscillating. Hence, the output of the laser system is a single frequency, dual mode, orthogonally polarized light wave.

SUMMARY OF THE INVENTION

While the foregoing prior art system is suitable for its intended purposes, some applications require two orthogonally polarized axial mode light waves to be produced at two separate frequencies. The present invention comprises a laser system, in which a gain cavity, a pump source, a single quarter-wave plate and a gain medium are combined to produce two orthogonally polarized axial mode light waves at a single frequency or at two frequencies. The gain cavity is comprised of a pair of mirrors, between which the gain medium is disposed. Note that the term "mirror" is used herein in a general sense to include any surface which is partly or highly reflective at a particular wavelength. The single quarter-wave plate is disposed adjacent to the entrance mirror. The gain medium is disposed adjacent to the quarter-wave plate, opposite the entrance mirror.

When the gain medium is energized by the pump source, two axial modes with linear polarization oscillate within the cavity. The modes are of slightly different frequency because the round-trip optical path lengths for each mode are not equal. The standing wave intensities of the modes are nearly 180° out of phase at the junction of the gain medium and the quarter-wave plate. The gain medium is disposed near the entrance mirror at the region of the cavity where the standing wave intensities of the modes are nearly 180° out of phase because in that region, the intensity sum of the two modes is nearly constant. In that region the gain medium operates efficiently, in a nearly saturated state, without the adverse effects of spatial hole burning.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENT

Figure 1:
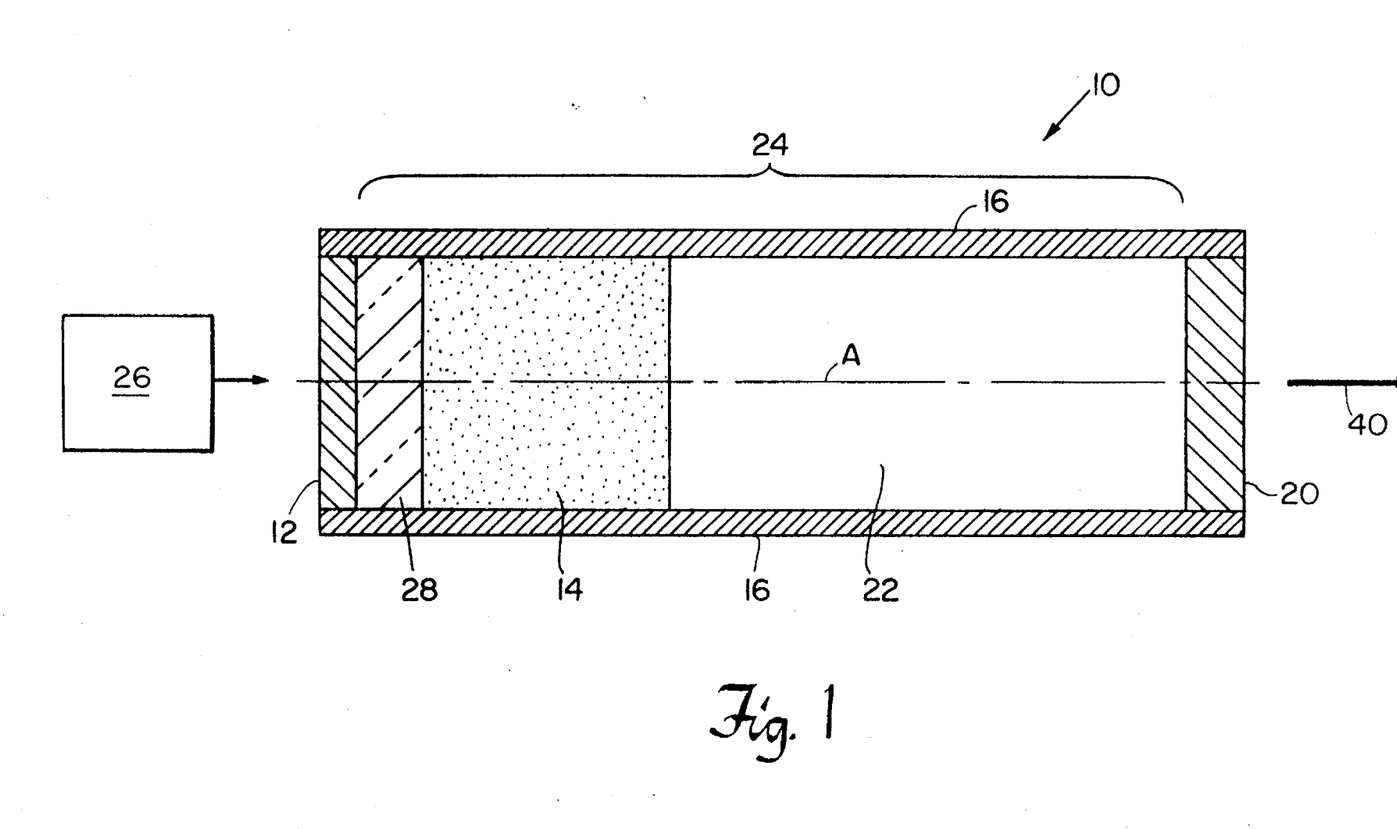
FIG. 1 is a schematic illustration of a two-axial-mode solid-state laser in accordance with a preferred embodiment of the invention.

A preferred embodiment of the laser system 10 is shown in FIG. 1. An entrance mirror 12 is disposed adjacent to a birefringent element 28, such as a quarter-wave plate which is disposed adjacent to a gain medium 14 at one end of a housing 16. At the other end of the housing 16, an exit mirror 20 is provided, leaving a gap 22 between the gain medium 14 and the exit mirror 20. The optical pump 26 energizes the laser, producing a population inversion in the gain medium 14.

The laser cavity 24 is longitudinally bound by the entrance and exit mirrors, 12 and 20 respectively. The mirrors form an optical resonator for light emitted by the gain medium 14. The entrance mirror 12 is highly reflective to light at the wavelength of the laser emission inside the cavity 24 and transmissive at the wavelength of light from the pump 26. The exit mirror 20 is partially transmissive, reflecting some light back into the laser cavity 24, and allowing some light to leave the cavity 24 as the output beam 40.

The birefringent element 28 is provided to polarize the two oscillating modes and to introduce a phase shift in one of the modes. For the present invention, the birefringent element is preferably a quarter-wave plate provided to orthogonally polarize the modes and to introduce a 180° phase shift between the standing wave intensities of the modes at the junction of the quarter-wave plate 28 and the gain medium 14.

The quarter-wave plate 28 causes the round-trip optical path lengths for the two orthogonally polarized modes to be different by approximately half a wavelength at the laser output wavelengths. Thus, the frequencies for the two orthogonally polarized modes produced in the laser cavity are not the same.

The gain medium 14 is preferably comprised of a solid-state material, such as Nd:YAG, Nd:YVO$_4$ or Nd:pentaphosphate. The gain medium 14 is energized by a diode laser pump source 26 which pumps the medium along the cavity axis A.

Figure 2:
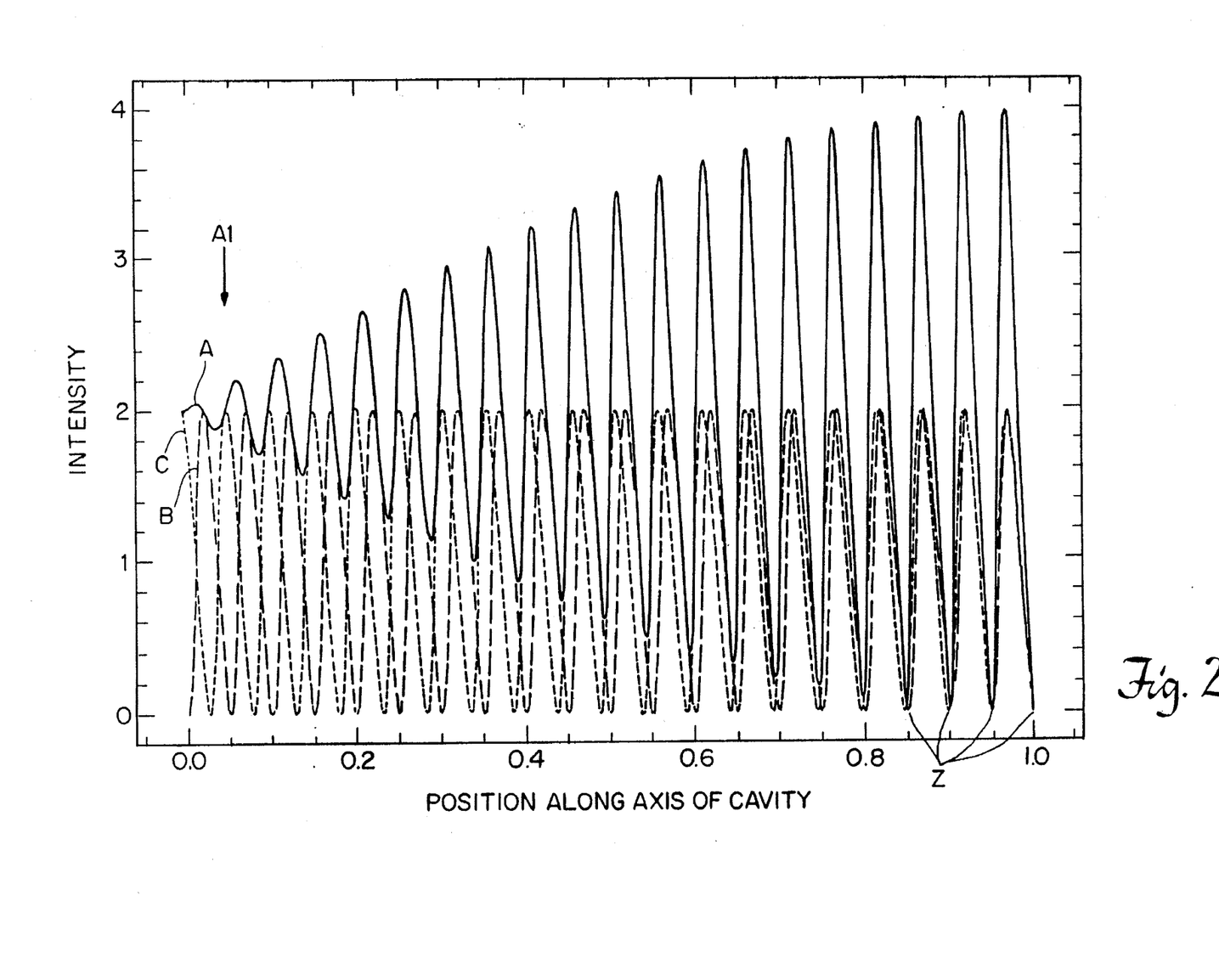
FIG. 2 is a plot of intracavity standing wave intensity as a function of position in the region of the cavity between the cavity exit mirror 20 and the interface of the quarter-wave plate 28 and the gain medium 14 for the laser depicted in FIG. 1. Note that the solid line A is the intensity sum, dashed line B is the intensity for the first mode and dotted line C is the intensity for the second mode.

In two-axial-mode lasers, it is desirable to have two orthogonally polarized standing wave intensity patterns at nearly 180° out of phase inside the gain medium 14 for optimal laser efficiency. In this manner, the sum of the intensity waves for each polarization is maintained nearly constant because the nulls in the first mode offset the nulls in the second mode as shown in FIG. 2, described below. When the intensity sum is constant, nearly all atoms are stimulated inside the gain medium, and the population inversion is uniformly saturated. No additional modes are allowed to lase because of the uniform saturation.

FIG. 2 is a plot of the standing intensity waves of two orthogonally polarized modes B, C as a function of position in the cavity 24 in the region of the cavity 24 between the exit mirror 20 at position 1.0 and the interface of the quarter-wave plate 28 and the gain medium 14 at position 0.0. At position 0.0 near the quarter-wave plate 28, the intensity waves B, C are 180° out of phase and therefore, their sum A is nearly constant Al, whereas near the exit mirror 20 at position 1.0, there are locations Z where the intracavity intensity sum is zero.

For optimal laser efficiency, the gain medium 14 is placed near position 0.0 where the intensity sum A of the two oscillating modes B, C is nearly constant Al, and where the inverted population is nearly saturated. In this region Al, the nulls in the first mode offset the nulls in the second mode. The length of the gain medium 14 must be kept short relative to the optical path length of the cavity 24. This requirement favors gain media with short absorption lengths such as those used in the microlasers described in U.S. Pat. Nos. 4,953,166 and 4,860,304.

This completes the description of the embodiment of FIG. 1. It should be noted that the two orthogonally polarized modes of propagation are generated with fewer optical components than required in the prior art. The gap 22 permits additional optical components such as birefringent crystals, electro-optic crystals and etalons to be placed therein, allowing the invention to be used in various applications, as will be described below in connection with FIG. 3 wherein like parts in FIG. 1 carry the same reference numeral with a prefix of 1.

Figure 3:
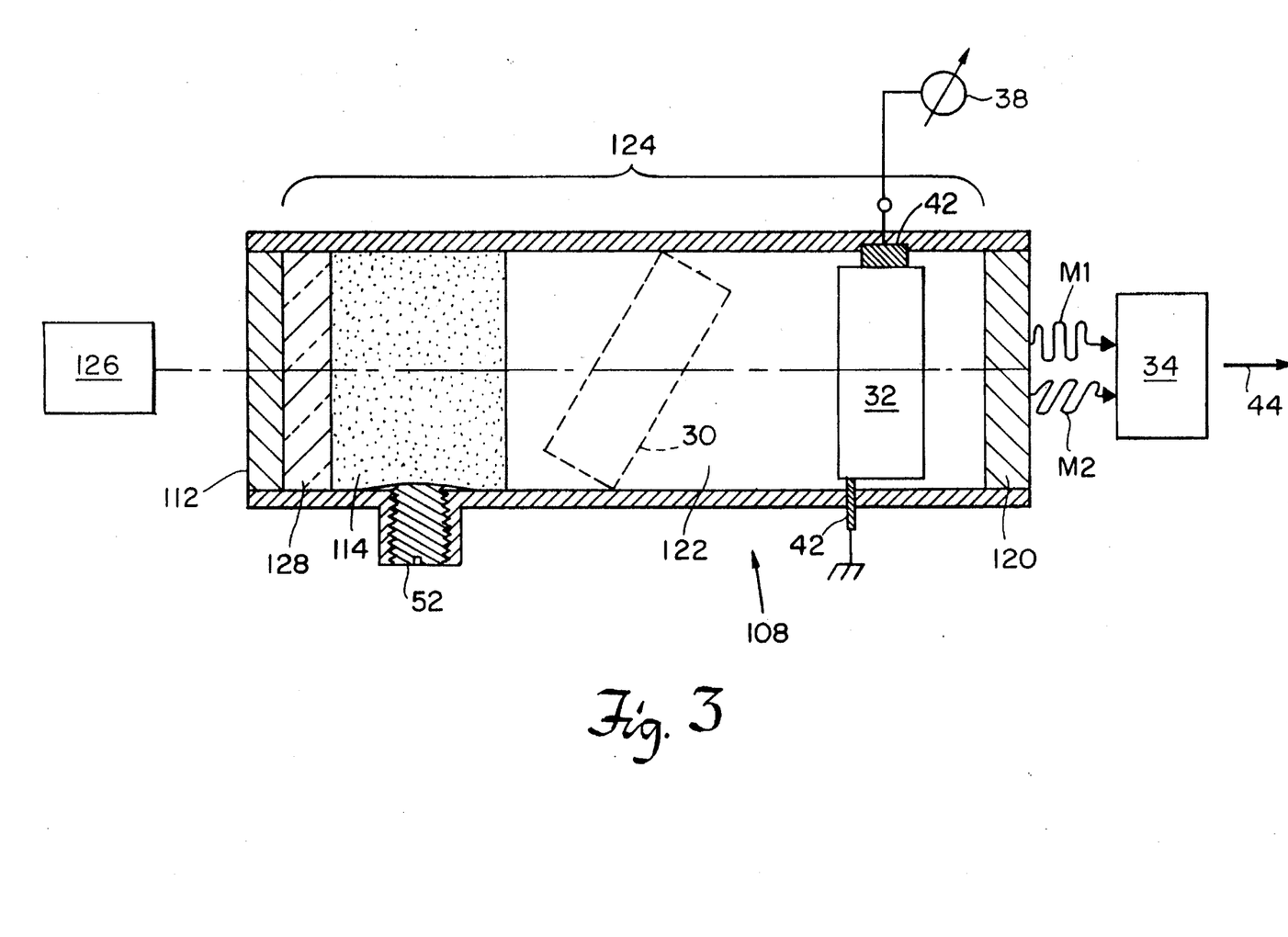
FIG. 3 is a schematic illustration of a two-axial-mode solid-state laser in accordance with an alternate embodiment of the invention.

One such application is the tuning of the two frequencies relative to each other. An electro-optic crystal 32, formed for example, of LiNbO$_3$ or LiTaO$_3$, is inserted into the cavity 124 in the gap 122 between the gain medium 114 and the exit mirror 120. The electrooptic crystal 32 is oriented in the cavity 124 such that the axes of its index ellipsoid under an applied variable electric field 38 are substantially along the same directions as the axes of the quarter-wave plate 128. An external electric field 38 applied to the crystal electrodes 42 induces a change in the index of refraction of the crystal 32, causing the optical path lengths of each polarization to change by different amounts. Thus, the frequencies of the two orthogonal modes can be tuned relative to each other.

The two orthogonal modes M1 and M2, separated by a variable frequency which can range from 0 Hz to 100 GHz, are emitted at the exit mirror 120. M1 and M2 may then be combined in an optical detector 34 having a sufficient bandwidth to produce difference frequencies. The difference, or beat frequency which is emitted as the output beam 44 from the detector 34 may be adjusted by varying the voltage 38 at the electrodes 42 of the electro-optic crystal 32.

The beat frequency of the two modes is a function of the difference in optical path lengths for the two allowed polarizations in the electro-optic crystal. If the round-trip optical path length difference in the electro-optic crystal is an integral number of wavelengths (i.e., the electro-optic crystal acts as a full wave plate for two passes) then the beat frequency is approximately equal to $c/4L$ where c is the speed of light and L is the optical path length for one polarization. If the round-trip optical path length difference is instead equal to half a wavelength, then the beat frequency is equal to zero. Other round-trip optical path length differences lead to beat frequencies between the two limits of 0 and $c/4L$. These beat frequencies assume that the two orthogonal modes are those closest to the peak of the laser gain. If no variation in difference frequency is desired, the difference frequency can be fixed between the two limits by inserting a birefringent material in place of the electro-optic crystal. Additionally, a birefringent material can be inserted into the laser cavity with the electro-optic crystal to bias the difference frequency.

Figure 4:
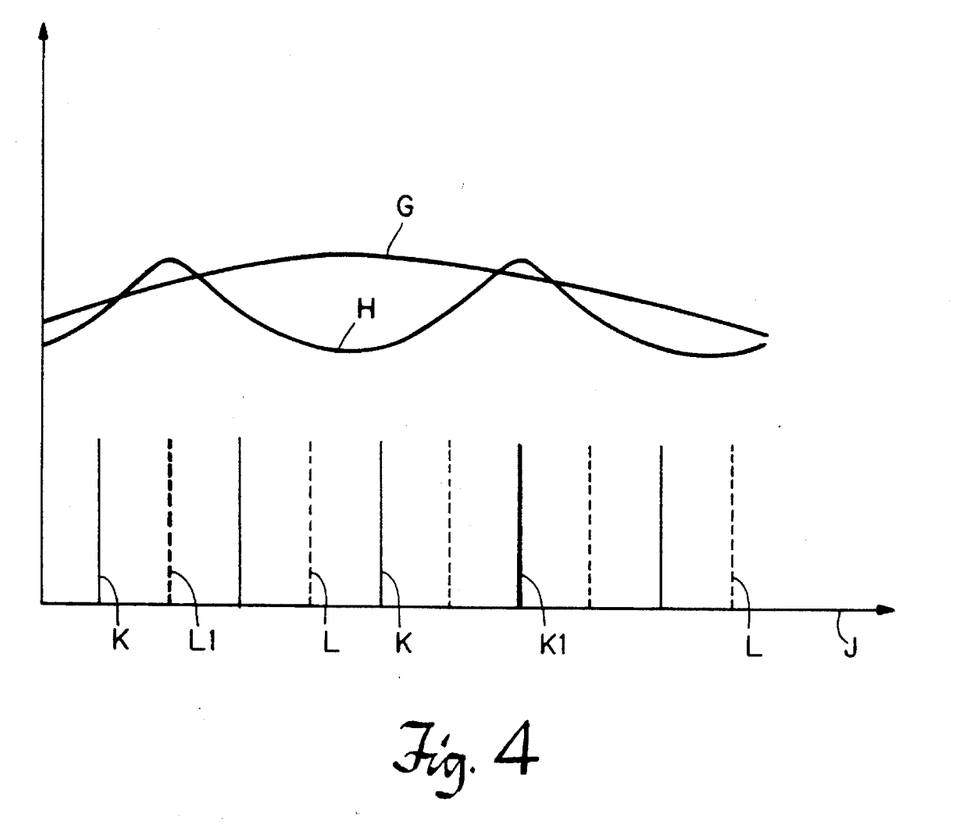
FIG. 4 is a plot of laser gain and etalon transmission as a function of frequency for the laser depicted in FIG. 3.

When difference frequencies greater than $c/4L$ are desired, a wavelength selective element such as the etalon 30 shown in phantom in FIG. 3 is added to select the two orthogonal modes whose difference gives the desired frequency. To obtain frequency difference and maintain orthogonal output polarizations, an etalon 30 with a free spectral range substantially equal to $mc/4L$ where m is an odd, positive integer is placed inside the laser cavity 124. The etalon 30 alters the properties of the laser cavity 124 such that two laser frequencies with $mc/4L$ separation are permitted to oscillate, all other cavity modes being suppressed by the etalon loss as shown in FIG. 4. Note that two-mode operation with an intracavity etalon with $mc/2L$ frequency spacing does not rely on the elimination of spatial hole burning. The location of the gain medium 114 and the quarter-wave plate 128 within the cavity 124 near the entrance mirror 112 may be relaxed in this case because the quarter-wave plate 128 functions primarily to separate allowed cavity-mode frequencies, eliminating the constraints on the exact placement of the quarter-wave plate 128, the etalon 30, and the gain medium 114 within the cavity 124 and also eliminating the constraint on the short length of the gain medium 114.

FIG. 4 is a plot of laser gain G and etalon transmission H as a function of frequency J. The cavity modes which are permitted to oscillate are represented by solid lines K and dashed lines L. Solid lines K are the vertical polarization modes and dashed lines L are the horizontal polarization modes. The etalon permits two non-adjacent, orthogonally polarized modes, L1 and K1, to reach lasing thresholds, while suppressing the remaining modes L and K.

If the laser is pumped sufficiently above threshold, additional modes beyond the initial two will oscillate. Higher power two-mode operation is obtained by placing the gain medium 114 at a location in the cavity 124 where spatial hole burning is eliminated.

Figure 5:
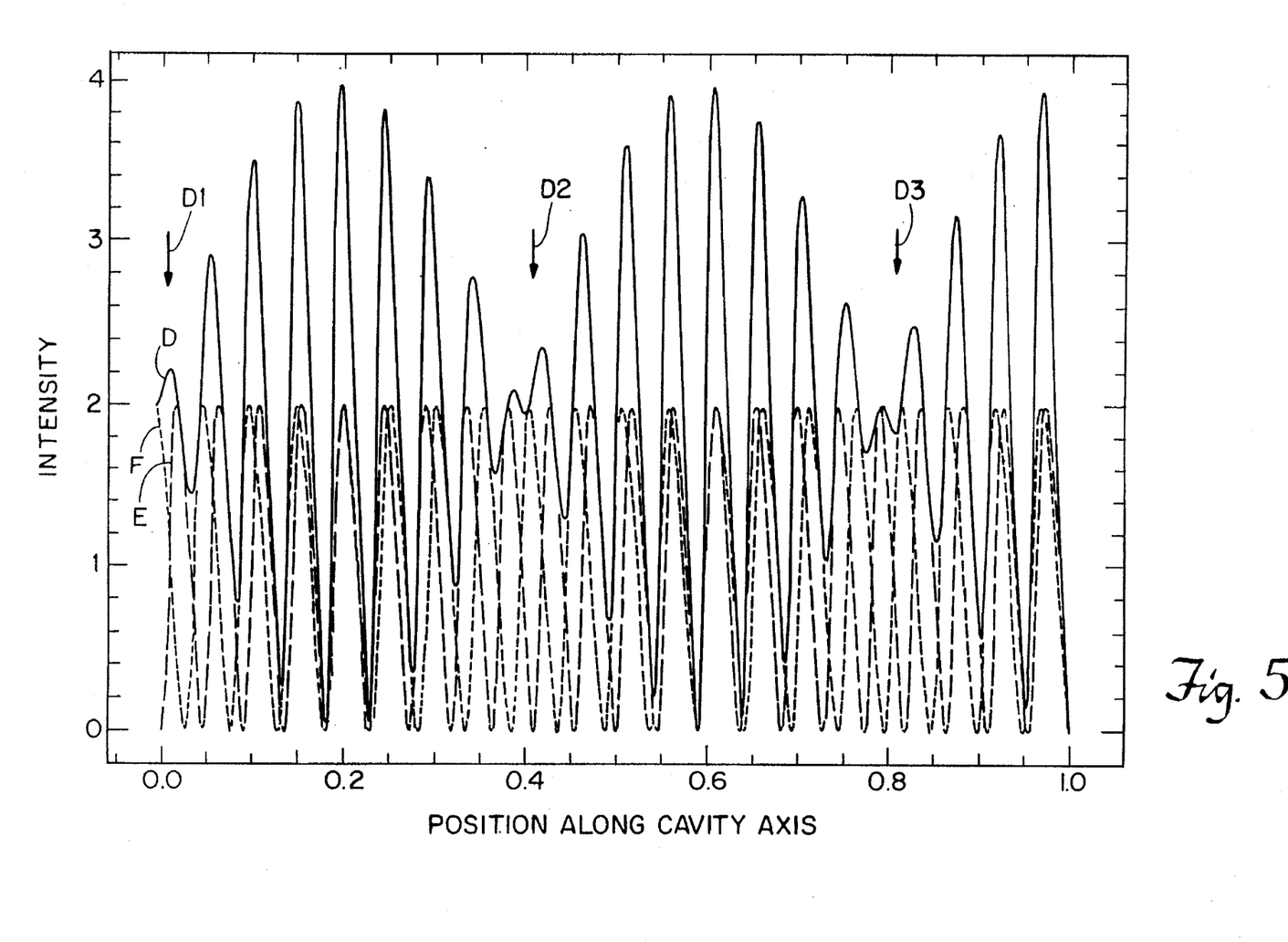
FIG. 5 is a plot of intracavity standing wave intensity as a function of position in the region of the cavity between the cavity exit mirror 120 and the interface of the quarter-wave plate 128 and the gain medium 114 for the laser depicted in FIG. 3. Note that solid line D is the intensity sum, dashed line E is the intensity for the first mode, and dotted line F is the intensity for the second mode.

FIG. 5 is a plot of the intracavity standing-wave intensity patterns as a function of cavity position between the junction of the quarter-wave plate 128 and the gain medium 114 at location 0.0 and the exit mirror 120 at location 1.0 for two modes with a frequency difference of mc/4L, assuming that the quarter-wave plate 128 is placed adjacent the entrance mirror 112 at location 0.0 where m=5. There are (m+1)/2 (or 3 for the example shown in FIG. 5, where m=5) locations in the cavity 124 where the intensity sum D of the two oscillating modes E, F is nearly constant D1, D2, D3. If the length of the gain medium 114 is short compared with 2L/(m+1), the gain medium 114 may be placed at any of these locations, and spatial hole burning will be largely eliminated. The general rule for determining the proper location of the gain medium 114 in the laser cavity 124 for spatial hole burning to be eliminated is that the gain medium 114 should be placed between the quarter-wave plate 128 and either the exit mirror 120 or the entrance mirror 112 at a distance of kL/m from the mirror where k is an odd, positive integer.

The discussion thus far has assumed that the index of refraction of the gain medium is isotropic, or in the case of a birefringent gain medium, the gain medium's optical axis is aligned with the laser cavity axis. In either case, the index of refraction of the gain medium for each orthogonal polarization is substantially the same.

There is an advantageous embodiment of a two-mode laser which uses a gain medium in which the indices of refraction for the two polarizations are different. In this embodiment, the indices of refraction are chosen so that the respective wavelengths of the orthogonally polarized modes are equal within the gain medium. If two modes with equal wavelengths are shifted by a quarter-wavelength in the gain medium, then spatial hole burning in the gain medium is eliminated. This obviates the length restriction on the gain medium. This difference in refractive index for the two polarizations is achieved by applying physical stress to the gain medium or by using a birefringent gain medium whose optical axis is at an angle to the laser cavity axis. A set screw 52 as shown in FIG. 3 could be used to apply mechanical stress to the gain medium 114.

In another embodiment which uses a gain medium exhibiting a different index of refraction for each polarization, the requirement for the quarter-wave plate is eliminated by strategic placement of the gain medium within the cavity. A birefringent gain medium or a gain medium with stress applied to it as shown in FIG. 3 may be used for this embodiment. Again, in a birefringent gain medium, the indices of refraction for each orthogonal mode are chosen so that the respective wavelengths of the orthogonally polarized modes are equal within the gain medium.

To achieve uniform sum intensity for the two modes within the gain medium, the two modes must have a quarter wavelength separation. Because the two modes have different frequencies and different vacuum wavelengths, the two modes will move from in phase to quarter wavelength separation over a distance of Nc/(4Δf) in a vacuum, or over a distance of Nc/(4nΔf) in an isotropic medium of refractive index n, where N is an odd positive integer, c is the speed of light in a vacuum and Δf is the frequency difference. The spacing of the gain medium from the end mirror in this embodiment serves the same purpose as the quarter-wave plate in the embodiments described above.

For this embodiment, if a gain medium with large gain bandwidth is used, additional frequency selectivity may be required for restricting the number of lasing modes to two. Frequency selection may be accomplished with an etalon or with a birefringent gain medium having a grating.

The difference frequency $\Delta f$ between the two modes can be written as: $\Delta f = (\Delta n/n_o)f_o$, where $\Delta n$ is the difference in index of refraction ($n_e - n_o$) between the ordinary polarization $n_o$, and the extraordinary polarization $n_e$, and $f_o$ is the frequency of the mode in ordinary polarization. For example, erbium-doped fiber, a common gain medium material used for 6500 $cm^{-1}$ lasers, can be made in polarization maintaining fiber with a $\Delta n = n_e - n_o = 7 \times 10^{-4}$, where $\Delta n$ is the difference in index of refraction between $n_e$, the extraordinary index of refraction and $n_o$ the ordinary index of refraction. The two modes will lase with a frequency difference of 90 GHz. Isotropic fiber, for example, glass fiber of length 0.56 mm is needed between the polarization maintaining fiber and each end mirror where the index of refraction of glass is n=1.5.

The invention described above has application in systems which require two closely spaced laser wavelengths, including: microwave generation; velocity sensing such as hetrodyne laser doppler velocimetry or wind velocity sensing; and chemical sensing. For example, in laser chemical sensors, one wavelength output may be tuned to the absorption peak of a chemical species while another closely spaced wavelength not on the absorption peak is used as a reference, so that a detectable beat frequency may be measured.

Applications which rely on a measurement of frequency difference are vulnerable to cavity mirror vibrations when two single-frequency lasers are used to generate the frequency difference. Each set of cavity mirrors for each laser vibrates at a particular frequency. Where two separate lasers are used in an application, the frequency difference due to the mirror vibration must be stabilized, using a resolver or compensator. For the present invention, the mirror vibrations are common for both frequencies and thus are largely cancelled out without extraneous compensation devices.

Any of a number of pump sources may be used to induce stimulated emission in the gain medium including: a high power flash lamp, a continuous lamp, a single diode, an array of diodes, or another laser. The pump can be any of a number of shapes including a helical shape surrounding the gain medium, or a cylindrical shape disposed parallel the gain medium. The pump may surround the gain medium, may be positioned adjacent to the gain medium, or may be disposed adjacent to the entrance mirror opposite the cavity.

In an alternate embodiment of FIG. 3, the quarter-wave plate 128 and gain medium 114 may be positioned adjacent to the exit mirror 120. If electro-optic crystals 32 or etalons 30 were needed, they would be placed in the gap 122, which in this case, would be near the entrance mirror 112.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A laser system comprising;
   a) a laser cavity defined between a first mirror and a second mirror;
   b) a gain medium;
   c) a source for pumping said gain medium with energy to cause stimulated emission of light waves;
   d) a single birefringent element disposed within said laser cavity for producing two orthogonally linearly polarized axial modes of light intensity; each of said modes propagating at a separate frequency, the difference between mode frequencies being $\Delta F$;
   e) a frequency selective optic disposed within said laser cavity for selecting $\Delta F$ to provide a plurality of locations within said laser cavity at which the sum of the intensities of said two modes is nearly constant; and
   f) said gain medium being located within said laser cavity at any of said locations.

2. The laser system of claim 1, further comprising an electro-optic crystal disposed within said cavity for varying the frequency of each orthogonally polarized mode.

3. The laser system of claim 1 further comprising an optical detector for sampling said orthogonal modes and for generating an energy wave of frequency equivalent to the frequency difference of said two orthogonal modes.

4. The laser system of claim 1 wherein said birefringent element comprises a quarter-wave plate.

5. The laser system of claim 1 wherein said birefringent element is disposed adjacent to said first mirror.

6. A laser system comprising:
   a) a laser cavity defined between a first mirror and a second mirror;
   b) a gain medium;
   c) a source for pumping said gain medium with energy for causing stimulated emission of light waves;
   d) a single birefringent element means disposed within said laser cavity adjacent to said first mirror for producing two orthogonally linearly polarized axial modes of light intensity; each of said modes propagating at a separate frequency, the difference between mode frequencies being $\Delta F$;
   e) a frequency selective optic disposed within said laser cavity for selecting $\Delta F$ to provide a plurality of locations within said laser cavity at which the sum of the intensities of said two modes is nearly constant; and
   f) said gain medium being located within said laser cavity at any of said locations.

7. The laser system of claim 6 further comprising an optical detector for sampling said orthogonal modes and for generating an energy wave of frequency equivalent to the frequency difference of said two orthogonal modes.

8. The laser system of claim 6 further comprising an electro-optic crystal disposed within said cavity for varying the frequency of each orthogonally polarized mode.

9. The laser system of claim 6 wherein said gain medium exhibits a different index of refraction for each said orthogonal mode, such that the wavelengths of said two orthogonal modes are substantially equal within said gain medium.

10. A laser system comprising:
    a) a laser cavity formed of a first mirror and second mirror;
    b) a source for pumping said laser cavity with energy; and
    c) a birefringent gain medium disposed between said mirrors; said birefringent gain medium being pumped by said energy source for producing two orthogonally polarized axial modes of light; each of said light waves having similar wavelengths within said birefringent gain medium, and having separate wavelengths external to said birefringent gain medium; said birefringent gain medium being disposed at a distance from said first mirror such that the sum of the intensities of said two orthogonal modes within said gain medium is nearly constant.

11. The laser system of claim 10 further comprising a frequency selective optic disposed within said cavity for selecting two non-adjacent orthogonal modes.

12. A method for producing polarized laser radiation comprising:
    a) forming a resonant cavity comprised of two oppositely disposed mirrors;
    b) disposing a single birefringent element within said resonant cavity;
    c) disposing a gain medium within said resonant cavity;
    d) pumping said resonant cavity with energy, for producing two orthogonally linearly polarized axial modes of light intensity propagating at separate frequencies, the difference between mode frequencies being $\Delta F$;
    e) disposing a frequency selective optic within said laser cavity for selecting $\Delta F$ to provide a plurality of locations within said laser cavity at which the sum of the intensities of said two modes is nearly constant; and
    f) locating said gain medium at any of said locations.

13. The method of claim 12 further comprising disposing an electro-optic crystal within said resonant cavity for varying the frequency of each orthogonally polarized mode.

14. The method of claim 12 further comprising sampling said orthogonal modes and generating an energy wave of frequency equivalent to the difference frequency of said two orthogonal modes.

15. The method of claim 12 wherein said birefringent element comprises a quarter-wave plate.

16. The method of claim 12 wherein said birefringent element is disposed adjacent to said first mirror.

17. A method for producing polarized laser radiation comprising:
    a) forming a resonant cavity comprised of two oppositely disposed mirrors;
    b) disposing a single birefringent element means within said resonant cavity between said mirrors and proximal to one of said mirrors;
    c) disposing a gain medium within said resonant cavity;
    d) pumping said resonant cavity with energy, producing two orthogonally linearly polarized axial modes of light intensity propagating at separate frequencies, the difference between mode frequencies being $\Delta F$;
    e) disposing a frequency selective optic within said laser cavity for selecting $\Delta F$ to provide a plurality of locations within said laser cavity at which the sum of the intensities of said two montes is nearly constant; and f) locating said gain medium at any of said locations.

18. The method of claim 17 further comprising sampling said orthogonal modes and generating an energy wave of frequency equivalent to the difference frequency of said two orthogonal modes.

19. The method of claim 17 further comprising disposing an electro-optic crystal within said resonant cavity for varying the frequency of each orthogonally polarized mode.

20. The method of claim 17 wherein said gain medium exhibits a different index of refraction for each said orthogonal mode, such that the wavelengths of said two orthogonal modes are substantially equal within said gain medium.

21. A method for producing polarized laser radiation comprising:
   a) forming a laser cavity comprising two oppositely disposed mirrors;
   b) pumping said laser cavity with energy; and
   c) disposing a birefringent gain medium between said mirrors; said birefringent gain medium producing two orthogonally polarized axial modes of light; each of said light waves having similar wavelengths within said birefringent gain medium, and having separate wavelengths external to said birefringent gain medium; said birefringent gain medium being disposed at a distance from one of said mirrors such that the sum of the intensities of said two orthogonal modes within said gain medium is nearly constant.

22. The method of claim 21 further comprising disposing a frequency selective optic within said resonant cavity so that two non-adjacent modes oscillate.

23. A laser system comprising
   a) a laser cavity defined between a first mirror and a second mirror;
   b) a gain medium;
   c) a source for pumping said gain medium with energy to cause stimulated emission of light waves;
   d) a single birefringent element means disposed within said laser cavity for producing two orthogonally linearly polarized axial modes of light intensity; each of said modes propagating at a separate frequency, the difference between mode frequencies being ΔF;
   e) a frequency selective optic disposed within said laser cavity for selecting ΔF to provide a plurality of locations within said laser cavity at which the sum of the intensities of said two modes is nearly constant; and
   f) said gain medium being located within said laser cavity at any of said locations.

24. The laser system of claim 23 wherein said gain medium exhibits a different index of refraction for each said orthogonal mode, such that the wavelengths of said two orthogonal modes are substantially equal within said gain medium.

25. The laser system of claim 24 wherein stress is applied to said gain medium so that said gain medium exhibits different indices of refraction for each orthogonal mode.

26. A method for producing polarized laser radiation comprising:
   a) forming a resonant cavity comprised of two oppositely disposed mirrors;
   b) disposing a single birefringent element means within said resonant cavity;
   c) disposing a gain medium within said resonant cavity;
   d) pumping said resonant cavity with energy, for producing two orthogonally linearly polarized axial modes of light intensity propagating at separate frequencies, the difference between mode frequencies being ΔF;
   e) disposing a frequency selective optic within said laser cavity for selecting ΔF to provide a plurality of locations within said laser cavity at which the sum of the intensities of said two modes is nearly constant; and
   f) locating said gain medium at any of said locations.

27. The method of claim 26 wherein said gain medium exhibits a different index of refraction for each said orthogonal mode, such that the wavelengths of said two orthogonal modes are substantially equal within said gain medium.

28. The method of claim 27 wherein stress is applied to said gain medium so that said gain medium exhibits different indices of refraction for each orthogonal mode.

29. A laser system comprising:
   a) a laser cavity defined between a first mirror and a second mirror;
   b) a gain medium;
   c) a source for pumping said gain medium with energy to cause stimulated emission of light waves;
   d) a single birefringent element disposed within said laser cavity for producing two orthogonally linearly polarized axial modes of light intensity; each of said modes propagating at a separate frequency, the difference between mode frequencies being ΔF;
   e) a frequency selective optic disposed within said laser cavity for selecting ΔF to provide a plurality of locations within said laser cavity at which the sum of the intensities of said two modes is nearly constant; and
   f) said gain medium being located within said laser cavity at any of said a locations, other than the location nearest said birefringent element.

* * * * *